United States Patent
Takahashi

(10) Patent No.: US 10,291,106 B2
(45) Date of Patent: May 14, 2019

(54) STATOR, ROTARY ELECTRIC MACHINE PROVIDED WITH THE STATOR AND METHOD OF MANUFACTURING THE STATOR

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 569 days.

(21) Appl. No.: 14/230,380

(22) Filed: Mar. 31, 2014

(65) Prior Publication Data

US 2014/0292118 A1 Oct. 2, 2014

(30) Foreign Application Priority Data

Mar. 29, 2013 (JP) .................... 2013-073183

(51) Int. Cl.
*H02K 9/00* (2006.01)
*H02K 15/085* (2006.01)
(Continued)

(52) U.S. Cl.
CPC ............. *H02K 15/085* (2013.01); *H02K 3/24* (2013.01); *H02K 3/487* (2013.01); *H02K 15/12* (2013.01); *Y10T 29/49009* (2015.01)

(58) Field of Classification Search
CPC ........ H02K 9/005; H02K 1/165; H02K 15/02; H02K 15/024; H02K 15/085; H02K 15/12; H02K 3/24; H02K 3/487; H02K 1/16; H02K 3/04; H02K 9/19; H02K 9/197; H02K 3/28; H02K 3/00; H02K 3/44;
(Continued)

(56) References Cited

U.S. PATENT DOCUMENTS 4,994,700 A * 2/1991 Bansal .................... H02K 3/24
310/215
5,936,326 A 8/1999 Umeda et al.
(Continued)

FOREIGN PATENT DOCUMENTS

JP 11-164504 6/1999
JP 2006-340409 12/2006
(Continued)

OTHER PUBLICATIONS

Office Action (2 pgs.) dated Feb. 24, 2015 issued in corresponding Japanese Office Action 2013-073183 with an at least partial English-language translation thereof (2 pgs.).

*Primary Examiner* — Thomas Truong
*Assistant Examiner* — Leda T Pham
(74) *Attorney, Agent, or Firm* — Nixon & Vanderhye P.C.

(57) ABSTRACT

In a stator, a stator winding is wound at a stator core. The stator winding has a section whose shape is rectangular and includes a plurality of conductors electrically connected to each other. Each of the conductors has in-slot portions being accommodated as being stacked in corresponding one of the slots when the winding is wound at the stator core. A fixing member fixes the in-slot portions to each of the slots. The fixing member is composed of an adhesive material charged into each of the slots such that a through-hole is left through each of the slots in the axial direction. Refrigerant is allowed to pass through the through-hole.

17 Claims, 6 Drawing Sheets

(51) Int. Cl.
*H02K 3/24* (2006.01)
*H02K 3/487* (2006.01)
*H02K 15/12* (2006.01)

(58) Field of Classification Search
CPC .. H02K 1/22; H02K 9/06; H02K 3/12; H02K 9/04; H02K 5/20; H02K 3/02; H02K 3/50; H02K 1/24; H02K 19/22; H02K 19/16; Y10T 29/49009
USPC ................................................ 310/201, 208
See application file for complete search history.

(56) References Cited

U.S. PATENT DOCUMENTS

| | | | |
|---|---|---|---|
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A * | 10/2000 | Umeda | H02K 1/165 310/179 |
| 6,144,136 A | 11/2000 | Umeda et al. | |
| 6,181,043 B1 | 1/2001 | Kusase et al. | |
| 6,181,045 B1 | 1/2001 | Umeda et al. | |
| 6,198,190 B1 | 3/2001 | Umeda et al. | |
| 6,291,918 B1 | 9/2001 | Umeda et al. | |
| 6,369,482 B1 * | 4/2002 | Rink, Jr. | H02K 15/063 29/606 |
| 6,459,177 B1 | 10/2002 | Nakamura et al. | |
| 6,459,186 B1 | 10/2002 | Umeda et al. | |
| 7,498,711 B2 * | 3/2009 | Biais | H02K 1/16 310/214 |
| 2003/0057797 A1 * | 3/2003 | Kaneko | H02K 1/146 310/216.064 |
| 2003/0098630 A1 * | 5/2003 | Owada | H02K 3/24 310/194 |
| 2005/0151429 A1 * | 7/2005 | Taketsuna | H02K 3/24 310/54 |
| 2010/0270094 A1 * | 10/2010 | Nakayama | H02K 3/12 180/65.7 |
| 2011/0181146 A1 | 7/2011 | Asano et al. | |

FOREIGN PATENT DOCUMENTS

| | | |
|---|---|---|
| JP | 2010-226861 | 10/2010 |
| JP | 2011-172464 | 9/2011 |
| WO | 2004/019468 | 3/2004 |
| WO | WO 2012/077215 | 6/2012 |

* cited by examiner (IV-IV LINE SECTION)

STATOR, ROTARY ELECTRIC MACHINE PROVIDED WITH THE STATOR AND METHOD OF MANUFACTURING THE STATOR

CROSS-REFERENCE TO RELATED APPLICATION

This application is based on and claims the benefit of priority from earlier Japanese Patent Application No. 2013-073183 filed Mar. 29, 2013, the description of which is incorporated herein by reference.

BACKGROUND OF THE INVENTION

Technical Field of the Invention

The present invention relates to a stator of a rotary electric machine that is installed in a vehicle and used as an electric motor or a generator, relates to a rotary electric machine provided with the stator, and relates to a method of manufacturing the stator.

Related Art

Well-known stators for rotary electric machines include a stator core and a stator winding. The stator core is provided with a plurality of slots arrayed in the circumferential direction. The stator winding, with conductors thereof being accommodated in each slot and electrically connected to each other, is wound about the stator core. A patent document JP-A-2010-226861, for example, discloses a stator winding which is formed of conductors (flat wires) each having a rectangular cross section perpendicular to the longitudinal direction.

With the activation of such a rotary electric machine, current passes through the stator winding. Accordingly, the conductors, which form the stator winding, generate heat on the basis of their electric resistance and thereby raise the temperature. In this case, when the stator winding is formed of flat wires as in the patent document JP-A-2010-226861, the conductors will have a high space factor in each slot. Therefore, compared to the case where a stator winding is formed of conductors each having a circular cross section perpendicular to the longitudinal direction (round wires), the flat wires will have a low resistance and hence will have a low copper loss to thereby minimize heat generation. On the other hand, however, use of flat wires raises a problem of not easily allowing passage of refrigerant, such as air or cooling oil, through each slot because the conductors are arrayed in the slot with almost no gap therebetween. This raises a problem of inefficient radiation performance.

SUMMARY

Hence it is desired to provide a stator which includes conductors that have a high space factor in each slot but ensures good radiation performance, a rotary electric machine provided with the stator, and a method of manufacturing the stator.

An exemplary embodiment provides a stator, comprising: a stator core having an axial direction, a circumferential direction and a radial direction, a plurality of slots being formed in the stator core to be arranged in the circumferential direction; a stator winding wound at the stator core, the stator winding having a section whose shape is rectangular and including a plurality of conductors electrically connected to each other, the section crossing with a length-wise direction of the conductor, each of the conductors having in-slot portions being accommodated in corresponding ones of the slots when the winding is wound at the stator core; and a fixing member (which fixes the in-slot portions to each of the slots, the fixing member being composed of an adhesive material charged into each of the slots such that a through-hole is left through each of the slots in the axial direction, refrigerant being allowed to pass through the through-hole.

According to this configuration, a through-hole is formed in each slot and the through-hole is defined by the adhesive material and other components accommodated in the slot to allow passage of refrigerant. Accordingly, refrigerant, such as air or cooling oil, can easily pass through the slot and thus the radiation performance is enhanced. Further, the stator winding is formed of conductors each having a rectangular cross section perpendicular to the longitudinal direction. Thus, the space factor of the conductors in each slot is well balanced with the radiation performance.

Another exemplary embodiment provides a rotary electric machine, comprising: a stator produced according to the above; a rotor arranged to be opposed to the stator in the radial direction and arranged to be rotatable; and refrigerant supply means for supplying the refrigerant to the stator.

According to this configuration, each slot of the stator core is provided with a through-hole through which refrigerant can pass. Accordingly, liquid refrigerant supplied to the stator by the refrigerant supply means passes through the through-hole provided in the slot. This ensures good radiation performance. Further, the stator winding is formed of conductors each having a rectangular cross section perpendicular to the longitudinal direction. This can realize a rotary electric machine with a stator in which the space factor of the conductors is increased in each slot and good radiation performance is ensured.

Still another exemplary embodiment provides a method of producing a stator having an axial direction, a circumferential direction and a radial direction, a plurality of slots being formed in the stator core to be arranged in the circumferential direction; the method comprising steps of: winding a stator winding at the stator core, wherein the stator winding has a section whose shape is rectangular and includes a plurality of conductors electrically connected to each other, the section crossing with a length-wise direction of the conductor, each of the conductors having in-slot portions being accommodated as being stacked in corresponding ones of the slots when the winding is wound at the stator core; arranging a spacer at a predetermined position in each of the slots; fixing the in-slot portions in each of the slots by charging a fixing member into each of the slots, the fixing member being an adhesive material; and removing the spacer from each of the slots such that a space occupied by the spacer in each of the slots is left as a through-hole therein.

According to this method, the winding step, the spacer arranging step, the conductor fixing step and the through-hole forming step are ensured to be sequentially performed. This enables simple and easy manufacture of the stator which is able to raise the space factor of the conductors in each slot and ensure good radiation performance.

The reference symbols in brackets for the elements set forth above or in the claims indicate correlation of the elements to the specific means described in the embodiments provided below.

DETAILED DESCRIPTION OF THE PREFERRED EMBODIMENTS

With reference to the accompanying drawings, hereinafter are described some embodiments of the present invention. In the description provided below, when a term "connection" is used, it refers to "electrical connection" unless explicitly defined. The same applies to the inflected forms of the term "connection". Further, the accompanying drawings include elements required for describing the invention but do not necessarily include all the actually mounted elements.

[First Embodiment]

Figure 1:
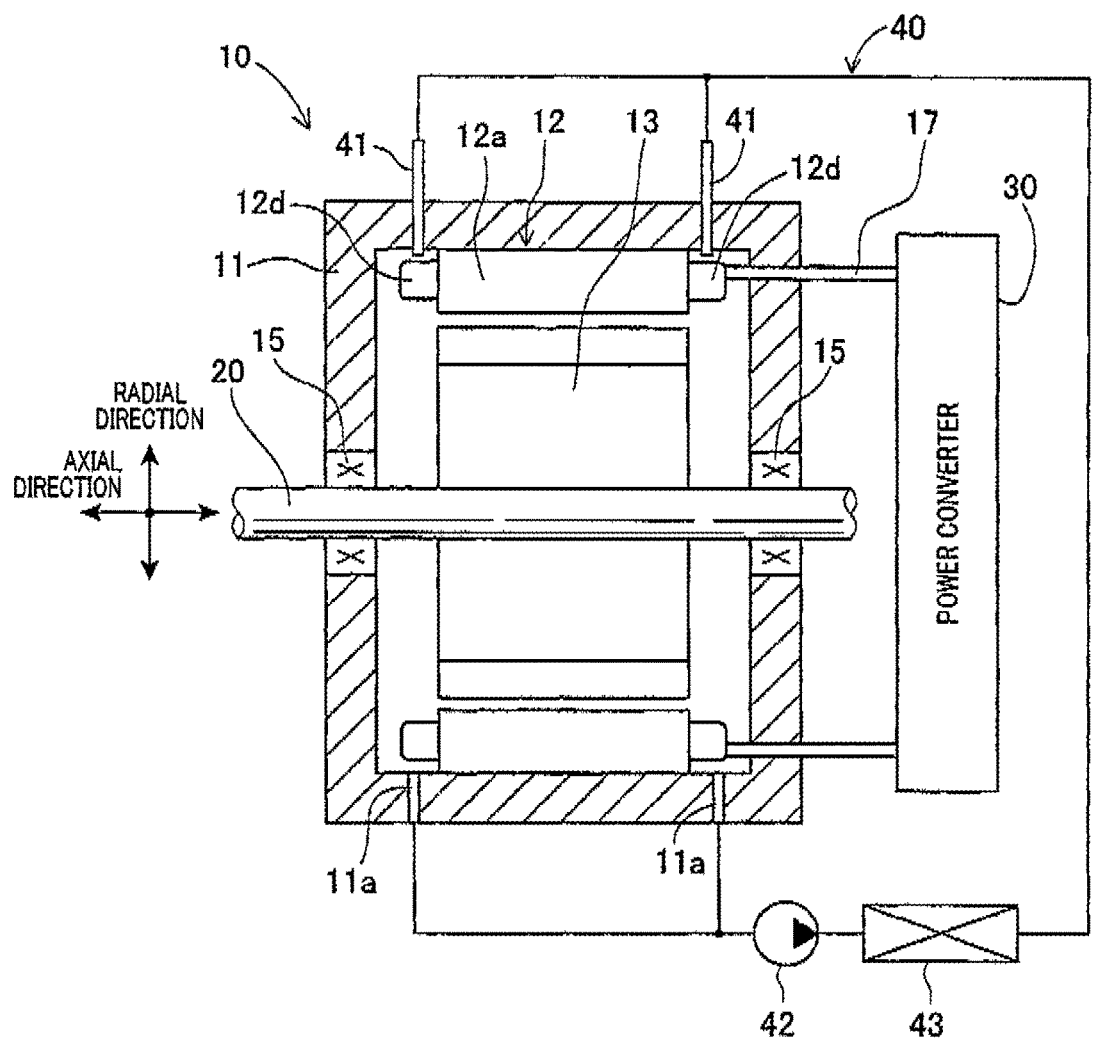
FIG. 1 is a schematic axial cross-sectional view illustrating a rotary electric machine, according to a first embodiment of the present invention.

Referring to FIGS. 1 to 10, hereinafter is described a first embodiment of the present invention. FIG. 1 is a schematic axial cross-sectional view illustrating a rotary electric machine 10 according to the first embodiment. The rotary electric machine 10 of the present embodiment is an example of an inner-rotor type rotary electric machine. As shown in FIG. 1, the rotary electric machine 10 includes a casing 11, stator 12, rotor 13, rotary shaft 20, power converter 30 and refrigerant supply means 40. The rotary electric machine 10 and the power converter 30 are connected to each other via an input/output line 17 or the like. The casing 11 of the rotary electric machine 10 may be formed separately from the casing (not shown) of the power converter 30 and the separate casings may be fixed to each other using a fixing means. Alternatively, these casings may be integrally formed. When the casings are separately formed, the fixing means corresponds to a joint which is formed, for example, by using bolts and nuts, external threads and internal threads, through holes and split pins, or welding, or corresponds to crimping of edges, or the like. Of these joints and crimping, two or more may be appropriately selected and combined to achieve fixation. The input/output line 17 may be formed by extending a conductor 18 described later.

Figure 2:
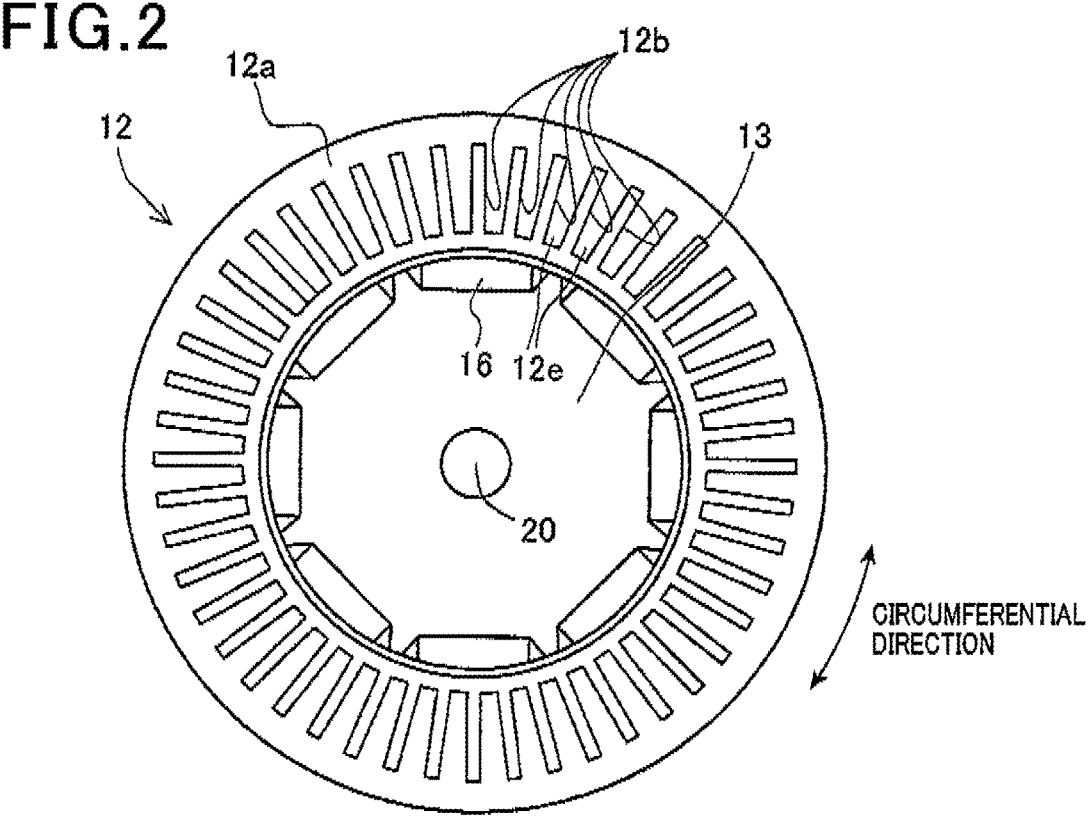
FIG. 2 is a plan view illustrating a stator core and a rotor, according to the first embodiment.

The rotary shaft 20 is rotatably supported by the casing 11 via bearings 15. The rotary shaft 20 may be fixed to a center portion of the rotor 13 using the fixing means mentioned above, or may be integrally formed with the rotor 13. Whichever of the configurations may be used, the rotary shaft 20 rotates cooperatively with the rotor 13. FIG. 2 is a plan view illustrating a stator core 12a of the stator 12 and the rotor 13. As shown in FIG. 2, the rotor 13 has an outer peripheral surface including magnetic pole positions at which permanent magnets 16 are embedded along the circumferential direction so that the polarities are alternated. In the rotor 13 of the present embodiment, the number of poles is eight (four N poles and four S poles).

The stator 12 includes the stator core 12a in an annular shape and a stator winding 12d (see FIG. 1). The stator core 12a is arranged on an outer peripheral side of the rotor 13 so as to be radially opposed to the rotor 13. The stator winding 12d is wound about the stator core 12a. The stator core 12a of the stator 12 is fixed to the casing 11 by the fixing means mentioned above so that the inner peripheral surface of the stator core 12a will be opposed to the outer peripheral surface of the rotor 13.

The stator core 12a has a plurality of slots 12b which are formed throughout the stator core 12a in the axial direction and arranged in the circumferential direction along the inner peripheral surface of the stator core 12a. The slots 12b are formed such that their openings will be open in the inner peripheral surface of the stator core 12a and their depth direction will coincide with the radial direction of the stator core 12a. The circumferential interval of the slots 12b may be optionally determined. However, the slots 12b may preferably be arranged at regular intervals, taking account of uniforming the flow of magnetic flux and increasing torque. Teeth 12e are each arranged between adjacent slots 12b.

The example of the slots 12b shown in FIG. 2 has a slot factor of two as indicated by S (S is a positive integer), a pole number (the number of poles) of eight in the rotor 13 as indicated by Mn (Mn is a positive integer), and a phase number (the number of phases) of three as indicated by p (p is a positive integer). In this example, the number of slots 12b (slot number Sn) is expressed by:

$$Sn = S \times Mn \times p = 2 \times 8 \times 3 = 48.$$

Figure 5:
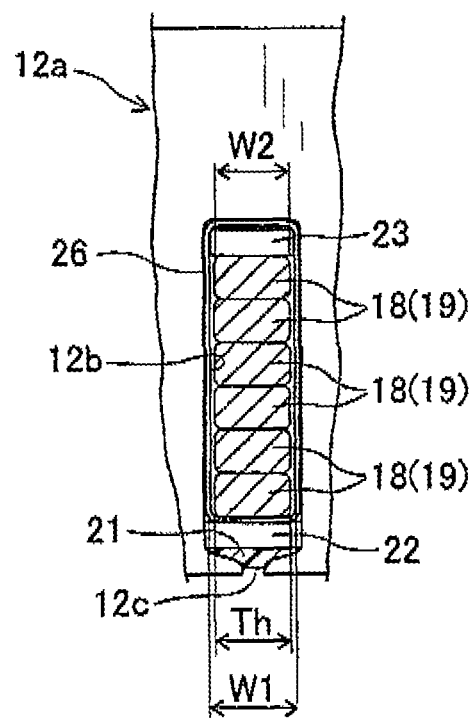
FIG. 5 is a partial plan view illustrating a part of the stator.

Each slot 12b accommodates conductors 18 configuring the stator winding 12d. FIG. 5 is a partial plan view illustrating the stator 12. For example, as shown in FIG. 5, a plurality of (four in the present embodiment) conductors 18 are radially stacked and arranged in a line in one slot 12b. A part of each conductor 18 axially projected out of an end face of the slot 12b serves as a turn portion 14 (see FIG. 3). The turn portions 14 of the conductors 18 are also collectively referred to as a coil end portion. As shown in FIG. 1, some of the turn portions 14 are extended as a lead and connected to the power converter 30.

Figure 3:
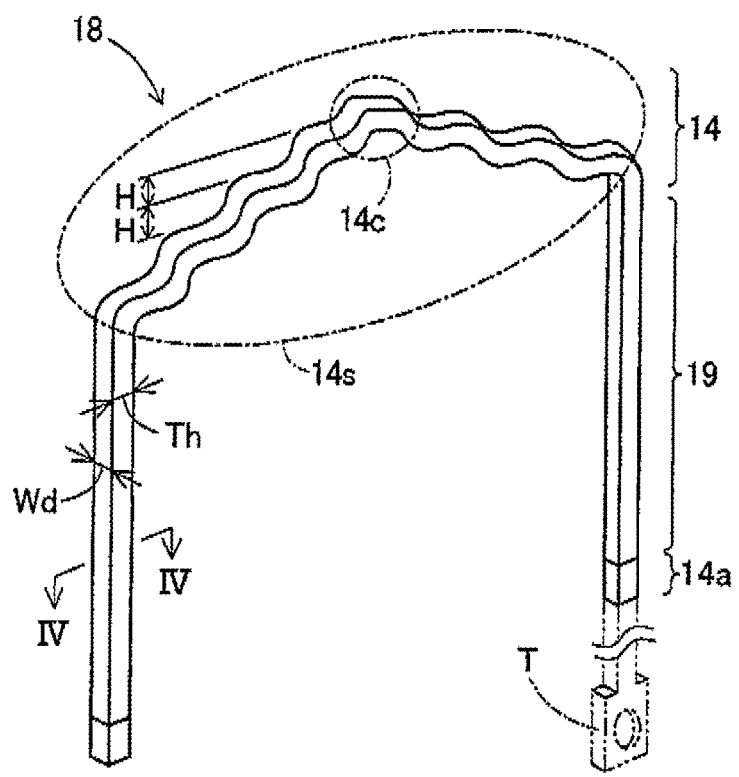
FIG. 3 is a perspective view illustrating a conductor configuring a stator winding, according to the first embodiment.

FIG. 3 is a perspective view illustrating the conductor 18 configuring the stator winding 12d. As shown in FIG. 3, the conductor 18 is formed as one member having a U shape and includes a single turn portion 14, two in-slot portions 19 and two end portions 14a. The turn portion 14 is formed with a staircase-pattern part 14s composed of a plurality of steps and formed to integrally connect the two in-slot potions into the one conductor 18. Each step of the staircase-pattern part 14s has a height H which may be optionally set. When the height H is made approximately equal to the height (i.e. thickness Th) of the conductor 18, the conductor 18 will be easily stacked in the radial direction. The number of steps of the staircase-pattern part 14s may be optionally determined. For example, the number of steps may be set to a value suitable for the distance between the in-slot portions 19.

As shown in FIG. 3, the two in-slat portions 18 are linear portions which are to be accommodated in designated two of the slots 12b when the stator winding 12d has been wound about the stator core 12a.

The staircase-pattern part 14s has a center portion in which a crank part 14c is formed by bending the center portion into a crank shape. The crank part 14c is formed for the purpose of offsetting the conductor 18 in the radial direction. In the crank part 14c, the height of projection of the conductor from an end face 12f of the stator core 12a will be maximized. The amount of offset in the radial direction may be optionally determined. When the amount of offset is made approximately equal to a width Wd of each conductor 18, the plurality of conductors 18 can be easily offset in the radial direction. The conductor 18 does not necessarily need to have a staircase pattern but may include only the crank part 14c.

Some of the conductors 18 are provided with a terminal T at the end portion 14a as indicated by the dash-dot-dot line in FIG. 3. Joint between the end portions 14a or between the end portion 14a and the terminal T may desirably be achieved by soldering, welding, or the like. Welding includes fusion welding (e.g., gas welding, arc welding, electro-slag welding and laser-beam welding) and pressure welding (e.g., resistance welding and forge welding).

Figure 4:
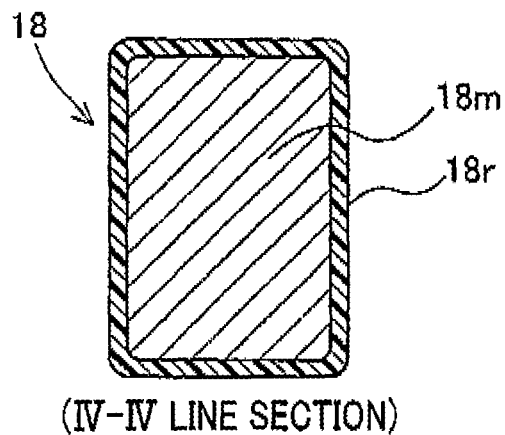
FIG. 4 is a cross-sectional view of the conductor taken along the line IV-IV of FIG. 3.

FIG. 4 shows a cross section of the conductor 18, taken along the line IV-IV of FIG. 3. In the conductor 18, the turn portion 14 and the in-slot portions 19 are ensured to have insulation property by providing an insulating film 18r (e.g., resin) over an electrically conductive metal member 18m (e.g., copper wire) that configures the conductor 18. On the other hand, the end portions 14a of the conductor 18 are not provided with an insulating film but the metal member 18m is exposed to establish connection.

As shown in FIG. 5, the conductors 18 are sequentially accommodated in a series of slots 12b according to a predetermined arrangement order. In this case, the conductors 18 are stacked in the slots 12b on a phase basis, i.e. for each of U phase, V phase and W phase. The end portions 14a are connected to each other, or the end portion 14a and the terminal T are connected to each other to form a Y (star) connection, a Δ (delta) connection or a mixed Y-Δ connection to thereby form the stator winding 12d wound about the stator core 12a.

As shown in FIG. 5, a plurality of (six in the present embodiment) conductors 18 radially stacked in a line are accommodated in each of the slots 12b, except for an optionally selected one slot 12b. The six conductors 18 (in-slot portions 19) accommodated in each slot 12b are electrically insulated from the stator core 12a by a piece of electrical insulating paper 26 which is arranged along the wall surfaces of the slot 12b. The in-slot portions of the six conductors 18, which are accommodated in the slots 12b, are fixed to the stator core 12a together with the insulating paper 26 by an adhesive material 21 filled in the slat 12b and solidified.

In each slat 12b, through-holes 22 and 23 are provided radially inward and radially outward, respectively, being peripherally defined by the adhesive material 21, the conductors 18 and the insulating paper 26 accommodated in the slot 12b. Refrigerant, such as air or cooling liquid, is permitted to pass through these through-holes 22 and 23. Each of the through-holes 22 and 23 has a through-hole shape whose cross section perpendicular to the axial direction is rectangular for example and runs throughout the stator core 12a in the axial direction.

The through-hole 22 provided radially inward in each slot 12b has three surfaces, i.e. the circumferentially lateral surfaces and the radially inner surface, defined by the adhesive material 21 or the wall surfaces of the slot, and has one surface, i.e. the radially outer surface, defined by the adhesive material 21 or the insulating paper 26. The through-hole 22 has a circumferential width W1 which is made larger than a circumferential width Th (see FIG. 3) of each in-slot portion 19 of the conductor 18. Thus, the through-hole 22 is ensured to have the larger circumferential width W1. Each slot 12b has an opening 12c that is open in the inner peripheral surface of the stator core 12a. The opening 12c is formed in a slit-like shape extending in the axial direction. The opening 12c is closed by the adhesive material 21 located between the opening 12c and the through-hole 22. Thus, the liquid refrigerant that has flowed into the through-hole 22 is ensured not to flow out from the opening 12c.

On the other hand, the through-hole 23 provided radially outward in each slot 12b has three surfaces, i.e. the circumferentially lateral surfaces and the radially outer surface, defined by the insulating paper 26 or the adhesive material 21, and has one surface, i.e. the radially inner surface, defined by the side surface of the radially outermost conductor 18 or the adhesive material 21. The through-hole 23 has a circumferential width W2 which is equal to the circumferential width Th of the in-slot portion 19.

Figure 6:
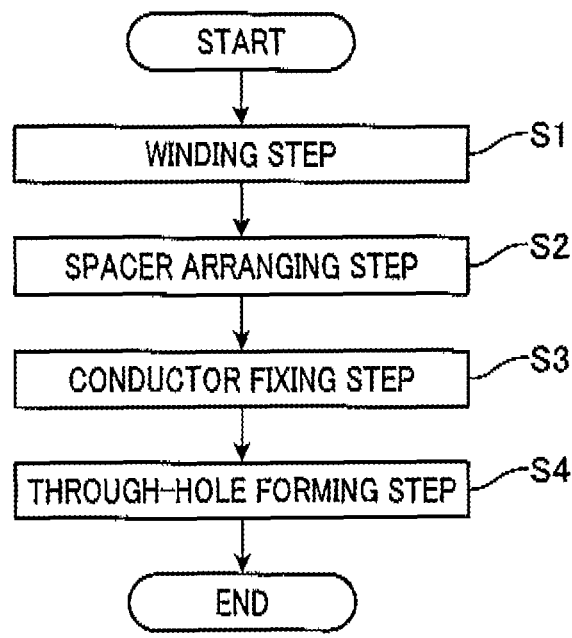
FIG. 6 is a flowchart illustrating a method of manufacturing the stator.

FIG. 6 is a flowchart illustrating a method of manufacturing the stator 12. The stator 12 configured as described above is manufactured according to the flowchart of FIG. 6. Specifically, as shown in FIG. 6, the stator 12 of the present embodiment is manufactured by sequentially performing a winding step S1, a spacer arranging step S2, a conductor fixing step S3 and a through-hole forming step S4.

Figure 7:
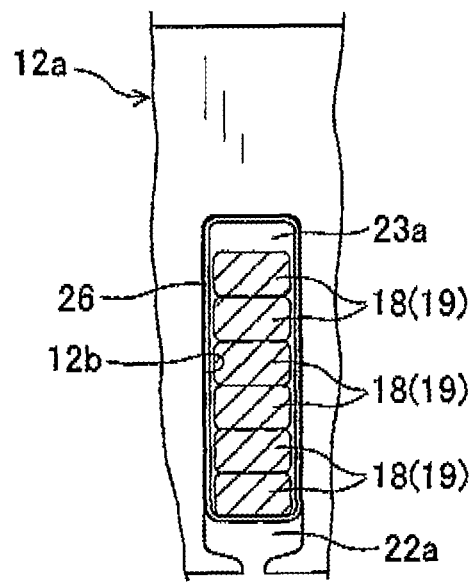
FIG. 7 is an explanatory view illustrating a winding step in the method.

FIG. 7 is an explanatory view illustrating the winding step S1 of the method. As shown in FIG. 7, the insulating paper 26 folded into a square cylindrical shape is arranged in each slot 12b along its wall surfaces. Further, six conductors 18 are radially arranged in a line inside the insulating paper 26 and connected to each other using a given method to thereby wind the stator winding 12d about the stator core 12a. In this case, spaces 22a and 23a for inserting spacers 24 and 25 (see FIG. 9), respectively, are formed inside the slot 12b so as to be located radially inward and outward, respectively, of the six conductors 18 radially stacked in a line.

Figure 8:
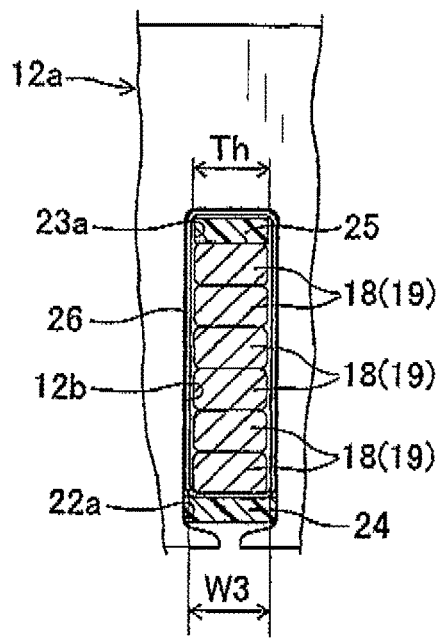
FIG. 8 is an explanatory view illustrating a spacer arranging step in the method.
Figure 9:
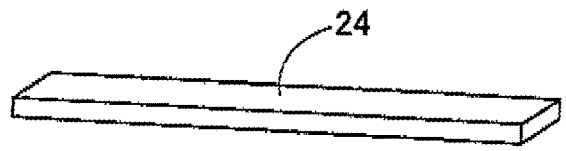
FIG. 9 is a perspective view illustrating a spacer used in the method.

FIG. 8 is an explanatory view illustrating the spacer arranging step S2 of the method. As shown in FIG. 8, at the spacer arranging step S2 subsequently performed, the spacers 24 and 25 are inserted and arranged in the spaces 22a and 23a (see FIG. 7), respectively, formed at the predetermined positions (radially lateral positions) of the slot 12b. FIG. 9 is a perspective view illustrating the spacer 24. The spacer 24 shown in FIG. 9 is inserted and arranged in the space 22a located radially inward. The spacer 24 has a width (in the circumferential direction) slightly smaller than a circumferential width W3 of the slot 12b. The spacer 24 is a plate member in a narrow rectangular shape and has a longitudinal length equal to that of the in-slot portion 19 of each conductor 18.

The spacer 25 inserted and arranged in the space 23a located radially outward has a width (in the circumferential direction) equal to the width Th of each conductor 18. The spacer 25 is also a plate member in a narrow rectangular shape and has a longitudinal length equal to that of the in-slot portion 19 of each conductor 18. The thickness (in the radial direction) of each of the spacers 24 and 25 is appropriately determined according to the difference between the radial depth of the slot 12b and the radial length of the line of the conductors 18, so that no gap is formed inside the slot 12b.

As will be described later, the spacers 24 and 25 are removed, at the through-hole forming step S4, from the solidified adhesive material 21. Taking account of the easiness of removing the spacers 24 and 25 at this step, it is desirable that the spacers 24 and 25 are made of a resin material having low affinity in the adhesiveness with the adhesive material 21. For example, a preferable resin material that can be used as the spacers 24 and 25 includes polyphenylenesulfide (PPS), a fluorine resin, a liquid-crystal polymer (LCP) or a resin reinforced by a glass filler.

Figure 10:
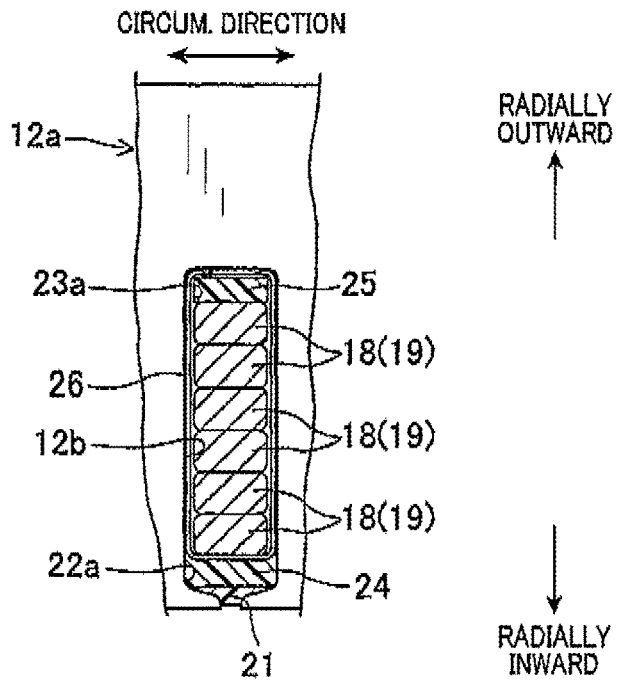
FIG. 10 is an explanatory view illustrating a conductor fixing step in the method.

FIG. 10 is an explanatory view illustrating the conductor fixing step S3 of the method. As shown in FIG. 10, at the conductor fixing step S3 subsequently performed, using a nozzle from which the adhesive material 21 is discharged, the adhesive material 21 is charged and filled in each slot 12b such that the adhesive material can penetrate into clearances left among the components in each slot 12b and then solidified. After being solidified, the adhesive material 12 functions as a fixing member in the respective slots 12b. The adhesive material 21 can be charged into the slots 12b from the inside of the stator core 12a in the radial direction or from a side of the stator core 12a in the axial direction.

Thus, the six conductors 18 and the insulating paper 26 accommodated in the slot 12b are fixed together to the wall of each slot 12B of the stator core 12a. In this case, the opening 12c located radially inward in the slot 12b is closed by the adhesive material 21 filled in between the spacer 24 and the opening 12c.

At the subsequent through-hole forming step S4, the spacers 24 and 25 inserted and arranged in the slot 12b are removed from the solidified adhesive material 21. Thus, the through-holes 22 and 23 are formed (see FIG. 5) after removal of the spacers 24 and 25, respectively. After that, a finishing process or the like is applied, as necessary, to completely form the stator 12. Then, all the manufacturing steps are ended.

Hereinafter is described the refrigerant supply means 40 that supplies a liquid refrigerant to the stator 12. As shown in FIG. 1, the liquid refrigerant supply means 40 of the present embodiment includes nozzles 41, a pump 42 and a radiator 43. The nozzles 41 drop liquid refrigerant (not shown) onto the coil end portions of the stator winding 12d. The pump 42 feeds liquid refrigerant to the nozzles 41. The radiator 43 discharges heat of the heated liquid refrigerant. The nozzles 41, the pump 42 and the radiator 43 are connected via piping for feeding liquid refrigerant and are set up on a circulation circuit of the liquid refrigerant.

In the present embodiment, the liquid refrigerant discharged from the pump 42 is fed to the nozzles 41 via the radiator 43 and dropped onto the turn portions 41 (coil end portions) of the stator winding 12d from the nozzles 41. The dropped liquid refrigerant goes down along the stator winding 12d, while refrigerating the stator 12, falls on the bottom portion of the casing 11 and returns to the pump 42 through outlet ports 11a formed in the bottom portion. After that, the liquid refrigerant is ensured to be again discharged from the pump 42 to circulate through the circulation circuit.

The rotary electric machine 10 configured as described above operates as follows. In FIG. 1, the stator 12 is excited on the basis of the power-converted drive current supplied from the power converter 30. The excitation generates rotating torque (including motive power) to thereby rotate the rotor 11 In this case, the rotary electric machine 10 operates as an electric motor. The generated rotating torque is outputted to rotating bodies (e.g., wheels or propellers) via the rotor 13 and rotary shaft 20. A motive power transmission mechanism may be interposed between the rotary shaft 20 and the rotating bodies. For example, the motive power transmission mechanism includes one or more of a shaft, a cam, a rack-and-pinion, and a gear.

When the power converter 30 does not output a power conversion signal and the rotating bodies generate torque (including motive power), the rotor 13 also rotates receiving the torque of the rotating bodies. Accordingly, counter electromotive force is generated in the conductors 18 of the stator 12. The generated counter electromotive force (regenerative electric power) can be charged into a battery via the power converter 30. In this case, the rotary electric machine 10 operates as a generator.

In this way, whether the rotary electric machine 10 operates as an electric motor or as a generator, the conductors 18 of the stator 12 are supplied with current and generate heat. In the present embodiment, concurrently with the start of operation of the rotary electric machine 10 as an electric motor or as a generator, the refrigerant supply means 40 also starts operation. Thus, the liquid refrigerant discharged from the pump 42 is dropped onto the coil end portions of the stator winding 12d from the nozzles 41. In this case, the liquid refrigerant dropped onto the coil end portions moves along the conductors 18 of the stator winding 12d and reaches the slots 12b. The liquid refrigerant then flows through the through-holes 22 and 23 provided in each slot 12b and efficiently refrigerates the stator winding 12d and the stator core 12a. Thus, good radiation performance is achieved in the stator 12.

As described above, the rotary electric machine 10 of the present embodiment includes the stator 12 having the slots 12b. Each of the slots 12b is provided with the through-holes 22 and 23, being defined by the adhesive material 21, the conductors 18 or the insulating paper 26, so that liquid refrigerant can pass through the through-holes. Accordingly, the liquid refrigerant can easily pass through the slots 12b and hence the radiation performance is enhanced. Further, the stator winding 12d is formed of the conductors 18 each having a rectangular cross section perpendicular to the longitudinal direction. Accordingly, the space factor of the conductors 18 is increased in each of the slots 12b. Thus, the space factor is well balanced with good radiation performance.

In the present embodiment, the through-holes 22 and 23 are formed by arranging the conductors 18 and the spacers 24 and 25 at predetermined positions in each slot 12b, filling the adhesive material 21 in the slot 12b for fixation of the conductors 18 and the spacers 24 and 25, and removing the spacers 24 and 25 from the slot 12b. In this way, the through-holes 22 and 23 are easily formed.

In the present embodiment, the spacers 24 and 25 are made of a resin material having low affinity in adhesiveness with the adhesive material 21. Accordingly, the spacers 24 and 25 can be easily removed from each slot 12b. The easy removal of the spacers can form a closure portion that closes the through-holes 22 and 23 formed after removal of the spacers 24 and 25, respectively, or can prevent deformation of the through-holes 22 and 23.

Further, according to the method of manufacturing the stator 12 of the present embodiment, the stator 12 is simply and easily manufactured. In the manufactured stator 12, the conductors 18 have a high space factor in each slot 12b and good radiation performance is ensured.

According to the stator 12 of the rotary electric machine 10 of the present embodiment, the conductors 18 have a high space factor in each slot 12b and good radiation performance is ensured.

[Second Embodiment]

Figure 11:
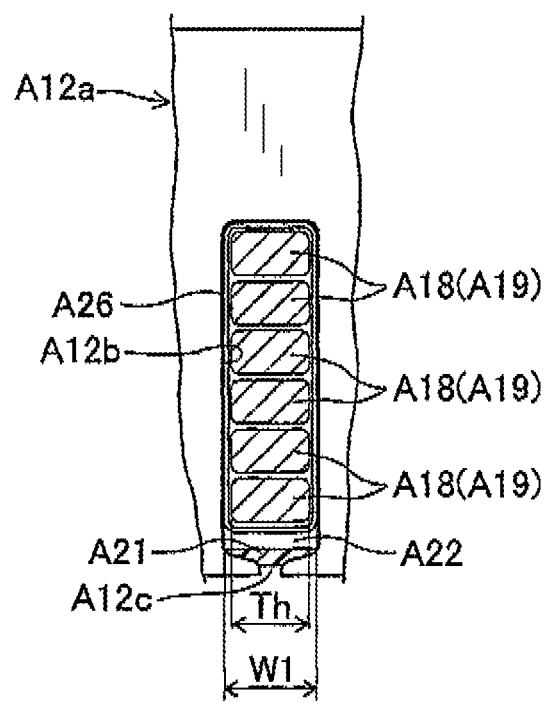
FIG. 11 is a partial plan view illustrating a stator, according to a second embodiment of the present invention.

Referring now to FIG. 11, hereinafter is described a stator A12 of the rotary electric machine 10 according to a second embodiment of the present invention. In the second embodiment, the components identical with or similar to those in the first embodiment are given the same reference numerals for the sake of omitting unnecessary explanation.

In the first embodiment described above, the through-holes 22 and 23 are provided radially inward and outward, respectively, in each slot 12b. However, in the present invention, optionally, only one through-hole may be provided radially inward or outward in each slot 12b, taking account of the balance with the space factor of the conductors 18 in the slot 12b.

FIG. 11 is a partial plan view illustrating the stator A12 of the second embodiment. As shown in FIG. 11, the stator A12 of the second embodiment includes a stator core A12a in which slots A12b are formed. Each slot A12b includes a single through-hole A22 provided radially inward in the slot A12b. Specifically, the stator A12 of the second embodiment is different from the stator 12 of the first embodiment in that the through-hole 23 provided radially outward in the slot 12b in the first embodiment is removed. The following description is focused on the differences, omitting specific description on the components and configuration common to those of the first embodiment.

Similar to the through-hole 22 of the first embodiment, the through-hole A22 of the second embodiment provided radially inward in the slot A12b is a through hole axially formed throughout the stator core A12a, with its cross section perpendicular to the axial direction being in a rectangular shape. The through-hole A22 has three surfaces, i.e. the circumferentially lateral surfaces and the radially inner surface, defined by an adhesive material A21 or the wall surfaces of the slot, and has one surface, i.e. the radially outer surface, defined by the adhesive material A21 or a piece of insulating paper A26. In this case as well, the through-hole A22 has a circumferential width W1 which is made larger than the circumferential width Th (see FIG. 3) of an in-slot portion A19 of each conductor A18. Thus, the through-hole A22 is ensured to have the larger circumferential width W1.

Each slot A12b has an opening A12c which is open in the inner peripheral surface of the stator core A12a. Similar to the first embodiment, the opening A12c is formed in a slit-like shape extending in the axial direction. The opening A12c of each slot A12 is closed by the adhesive material A21 located between the opening A12c and the through-hole A22. Thus, liquid refrigerant that has flowed into the through-hole A22 is ensured not to flow out from the opening A12c.

The stator A12 of the second embodiment is manufactured using a method similar to the one used for the stator 12 of the first embodiment.

Similar to the first embodiment, the rotary electric machine of the second embodiment configured as described above selectively operates as an electric motor or a generator. With the start of the operation, the refrigerant supply means 40 also starts operation. Thus, the liquid refrigerant dropped from the nozzles 41 onto the coil end portions of the stator winding 12d moves along the conductors A18 of the stator winding 12d and reaches the slots A12b. Then, the liquid refrigerant flows through the through-hole A22 formed in each slot A12b to efficiently refrigerate the stator winding 12d and the stator core A12a. Thus, good radiation performance of the stator A12 is achieved. Further, in the second embodiment as well, the stator winding 12d is formed of the conductors A18 each having a rectangular cross section perpendicular to the longitudinal direction. Accordingly, the advantageous effects similar to those of the first embodiment can be enjoyed, including that the space factor of the conductors is well balanced with the radiation performance.

In particular, in the second embodiment, the through-hole A22 is provided radially inward in each slot A12b and the opening A12c of the slot A12b is closed by the adhesive material A21 located between the opening A12c and the through-hole A22. Thus, the liquid refrigerant flowed into the through-hole A22 is ensured not to flow out from the opening A12c into the space between the stator 12 and the rotor 13. Accordingly, when the rotor 13 is rotated, drag loss is reduced, which would otherwise be caused by the shear force acting on the liquid refrigerant present between the stator 12 and the rotor 13.

It should be appreciated that in the case of the first embodiment as well, drag loss is reduced similar to the second embodiment because the through-hole 22 is formed radially inward in each slot 12b and the opening 12c of the slot 12b is closed by the adhesive material 21 located between the opening 12c and the through-hole 22.

[Other Embodiments]

The present invention is not limited to the foregoing embodiments but may be modified in various ways within the scope not departing from the spirit of the present invention.

For example, the rotary electric machine 10 of the foregoing embodiments is of liquid-cooling type, which is provided with the refrigerant supply means 40 that supplies liquid refrigerant to the stator 12. However, the present invention may be applied to a rotary electric machine of an air-cooling type, which blows air to the stator 12 using a fan or the like.

The stator winding 12d of the foregoing embodiments is a segment type winding formed by connecting end portions of the U-shaped conductors 18 (conductor segments). However, the present invention may be applied to different type windings. For example, the present invention may be applied to a woven type winding formed by weaving a plurality of continuous wires, in each of which a plurality of in-slot portions 19 and turn portions 14 are alternately and serially formed. Further, the present invention may be applied to a stacked-structure type winding formed by stacking a plurality of continuous wires, in each of which a plurality of in-slot portions 19 and turn portions 14 are alternately and serially formed, to provide a stacked structure, followed by cylindrically winding the stacked structure.

The rotary electric machine described in the foregoing embodiments is of inner-rotor type in which the rotor 13 is arranged inside the stator 12. However, the present invention may be applied to an outer-rotor type rotary electric machine in which the rotor 13 is arranged outside the stator 12.

In the foregoing embodiments, the present invention is applied to a rotary electric machine selectively used as an electric motor or a generator. However, the stator of the present invention may also be applied to a rotary electric machine that solely functions as an electric is motor or a generator.

What is claimed is:

1. A stator, comprising:
a stator core i) having an axial direction, a circumferential direction and a radial direction and ii) having a radially inner surface and a plurality of slots, the plurality of slots being formed in the stator core to be arranged in parallel in the circumferential direction, each of the slots being opened inwardly from the inner surface via an opening formed therethrough in the radial direction, the opening being slit-shaped and narrower in width than each of the slots in the circumdferential direction;
a stator winding wound at the stator core, the stator winding having a section whose shape is rectangular and including a plurality of conductors electrically connected to each other, the section crossing with a length-wise direction of the conductor, each of the conductors having in-slot portions being accommodated in corresponding ones of the slots in the axial direction, the in-slot portions being stacked on one another in each of the slots in the radial direction;
an electrical insulating paper arranged in each of the slots, the insulating paper being located between a wall of each of the slots and the stacked in-slot portions in each of the slots; and
a fixing member which fixes both the in-slot portions and the electrical insulating paper to the wall of each of the slots and which closes the opening of each of the slots, the fixing member being composed of an adhesive material charged into each of the slots via the opening and being solidified to close the opening such that a through-hole is left adjacently to the stacked in-slot portions in each of the slots in the radial direction, the through-hole running through the stator in the axial direction, refrigerant being allowed to pass through the through-hole.

2. The stator of claim 1, wherein the through-hole is two in number, one of the through-holes is arranged adjacently to an innermost conductor of the in-slot portions in each of the slots in the radial direction and the other of the through-holes is arranged adjacently to an outermost conductor of the in-slot portions in each of the slots in the radial direction.

3. The stator of claim 2, wherein the through-holes have a width in the circumferential direction and the in-slot portions of the conductor have a width in the circumferential direction, the width of the through-holes being larger than the width of the in-slot portions.

4. The stator of claim 1, wherein the through-holes have a width in the circumferential direction and the in-slot portions of the conductor have a width in the circumferential direction, the width of the through-holes being larger than the width of the in-slot portions.

5. The stator of is claim 1, wherein the through-holes have a width in the circumferential direction and the in-slot portions of the conductor have a width in the circumferential direction, the width of the through-holes being larger than the width of the in-slot portions.

6. The stator of claim 1, wherein the through-hole is formed by using a spacer such that the spacer is placed at a predetermined position in each of the slots, the in-slot portions and the spacer are fixed to the wall with the fixing member, and then the spacer is removed from each of the slots.

7. The stator of claim 6, wherein the spacer is made of a resin material of the spacer is made of one selected from a group consisting of polyphenylenesulfide (PPS), fluorine resin, liquid-crystal polymer (LCP) and resin reinforced by a glass filler.

8. The stator of claim 1, wherein the through-hole formed in each of the slots consists of a single through-hole, the single through-hole being formed adjacently to either an innermost conductor or an outermost conductor of the in-slot portions accommodated in each of the slots in the radial direction.

9. A rotary electric machine, comprising:
a stator, wherein the stator comprising:
a stator core i) having an axial direction, a circumferential direction and a radial direction and ii having a radially inner surface and a plurality of slots, the plurality of slots being formed in the stator core to be arranged in parallel in the circumferential direction, each of the slots being o tined in from the inner surface via an opening, formed therethrough in the radial direction, the opening being slit-shaped and narrower in width than each of the slots in the circumferential direction;
a stator winding wound at the stator core, the stator winding having a section whose shape is rectangular and including a plurality of conductors electrically connected to each other, the section crossing with a length-wise direction of the conductor, each of the conductors having in-slot portions being accommodated in corresponding ones of the slots in the axial direction, the in-slot portions being stacked on one another in each of the slots in the radial direction;
an electrical insulating paper arranged in each of the slots, the insulating paper being located between a wall of each of the slots and the stacked in-slot portions in each of the slots; and
a fixing member which fixes both the in-slot portions and the electrical insulating paper to the wall of each of the slots and which closes the opening each of the slots, the fixing member being composed of an adhesive material charged into each of the slots via the opening and being solidified to close the owning such that a through-hole is left adjacently to the stacked in-slot portions in each of the slots in the radial direction, the through-hole running through the stator in the axial direction, refrigerant being allowed to pass through the through-hole;
a rotor arranged to be opposed to the stator in the radial direction and arranged to be rotatable; and
refrigerant supply means for supplying the refrigerant to the stator.

10. The rotary electric machine of claim 9, wherein
the through-hole is positioned adjacently to an innermost conductor of the in-slot portions stacked in each of the slots in the radial direction and formed to run through the axial direction in each of the slots.

11. The rotary electric machine of claim 10, wherein the through-holes have a width in the circumferential direction and the in-slot portions of the conductor have a width in the circumferential direction, the width of the through-holes being larger than the width of the in-slot portions.

12. The rotary electric machine of claim 9, wherein the through-holes have a width in the circumferential direction and the in-slot portions of the conductor have a width in the circumferential direction, the width of the through-holes being larger than the width of the in-slot portions.

13. A method of producing a stator core
the method comprising steps of:
preparing the stator core i) having an axial direction, a circumferential direction and a radial direction and ii) having a radially inner surface and a plurality of slots, the plurality of slots being formed in the stator core to be arranged in parallel in the circumferential direction, each of the slots being opened inwardly from the inner surface via an opening formed therethrough in the radial direction, the opening being slit-shaped and narrower in width than each of the slots in the circumferential direction;

arranging an electrical insulating paper in each of the slots, the insulating paper being located along a wall of each of the slots:

winding a stator winding at the stator core, wherein the stator winding has a section whose shape is rectangular and includes a plurality of conductors electrically connected to each other, the section crossing with a lengthwise direction of the conductor, each of the conductors having in-slot portions being accommodated as being stacked in corresponding ones of the slots in the axial direction, the in-slot portions being stacked on one another in each of the slots in the radial direction, the insulating paper being located between the wall and the stacked in-slot portions in each of the slots;

arranging a spacer at a predetermined position in each of the slots;

fixing both the in-slot portions and the electrical insulating paper to the wall in each of the slots by charging a fixing member into both an inside of each of the slots and the opening of each of the slots, the fixing member being an adhesive material; and removing, when the charged fixing member has been solidified, the spacer from each of the slots such that a space occupied by the spacer in each of the slots is left as a through-hole, the through-hole running through the stator and located adjacently to the in-slot portions in each of the slots in the radial direction.

14. The method of claim 13, wherein the through-hole is two in number, one of the through-holes is arranged adjacently to an innermost conductor of the in-slot portions in each of the slots in the radial direction and the other of the through-holes is arranged adjacently to an outermost conductor of the in-slot portions in each of the slots in the radial direction.

15. The method of claim 13, wherein the through-hole formed in each of the slots consists of a single through-hole, the single through hole being formed adjacently to either an innermost conductor or an outermost conductor of the in-slot portions accommodated in each of the slots in the radial direction.

16. The method of claim 13, wherein the through-holes have a width in the circumferential direction and the in-slot portions of the conductor have a width in the circumferential direction, the width of the through-holes being larger than the width of the in-slot portions.

17. The method of claim 13, wherein the spacer is made of a resin material of the spacer is made of one selected from a group consisting of polyphenylenesulfide (PPS), fluorine resin, liquid-crystal polymer (LCP) and resin reinforced by a glass filler.

* * * * *